(12) United States Patent
Kamatani et al.

(10) Patent No.: US 8,605,366 B2
(45) Date of Patent: Dec. 10, 2013

(54) DRIVER

(75) Inventors: Yoshiteru Kamatani, Kanagawa (JP); Kazuhiro Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/821,351

(22) Filed: Jun. 23, 2010

(65) Prior Publication Data

US 2011/0013289 A1     Jan. 20, 2011

(30) Foreign Application Priority Data

Jul. 17, 2009   (JP) .................................. 2009-168437

(51) Int. Cl.
  *G02B 15/14*      (2006.01)
  *G02B 7/02*       (2006.01)

(52) U.S. Cl.
  USPC .......................... 359/698; 359/822; 359/823

(58) Field of Classification Search
  USPC ...................... 359/694, 696, 698, 822–824
  See application file for complete search history.

(56) References Cited

U.S. PATENT DOCUMENTS

| 7,974,025 | B2 * | 7/2011 | Topliss | ........................ 359/823 |
| 2009/0034094 | A1 * | 2/2009 | Noda et al. | .................... 359/694 |
| 2009/0268319 | A1 * | 10/2009 | Woo et al. | ...................... 359/824 |
| 2010/0002317 | A1 * | 1/2010 | Osaka et al. | .................. 359/824 |
| 2010/0060776 | A1 | 3/2010 | Topliss et al. | |
| 2011/0096421 | A1 * | 4/2011 | Hirata et al. | .................. 359/823 |

FOREIGN PATENT DOCUMENTS

| JP | 2008-099156 | | 4/2008 |
| WO | WO 2007018086 | A1 * | 2/2007 |

* cited by examiner

*Primary Examiner* — Mahidere Sahle
(74) *Attorney, Agent, or Firm* — Robert J. Depke; The Chicago Technology Law Group, LLC

(57) ABSTRACT

A driver includes: a first member that holds a lens; a second member to which the first member is fixed; and drive means for driving the second member, wherein a portion in which at least part of the drive means is accommodated is provided in the side surface of the second member.

6 Claims, 11 Drawing Sheets

DRIVER

The present application claims priority to Japanese Patent Application JP 2009-168437 filed in the Japanese Patent Office on Jul. 17, 2009, the entire contents of which is hereby incorporated by reference.

BACKGROUND OF THE INVENTION

1. Field of the Invention

The present invention relates to a driver, and particularly to, for example, a driver that allows reduction in size of a lens driving portion.

2. Description of the Related Art

FIG. 1 shows the configuration of an exemplary driver of related art. A driver 10 shown in FIG. 1 includes a lens carrier 11, a housing 12, a hook 13, a wire 14, and electrodes 15. The lens carrier 11 is accommodated in the housing 12 in such a way that the lens carrier 11 can move upward and downward relative to the housing 12. The hook 13 is disposed on part of the lens carrier 11 and protrudes through a side surface (outer side) of the housing 12.

The wire 14 is hooked on the hook 13. The wire 14 is disposed along at least two sides of the side surface of the housing 12. An electrode 15 is provided at one end of the wire 14, and an electrode 16 is provided at the other end of the wire 14. The wire 14 is made of a shape memory alloy. When a current is conducted from the electrode 15 to the electrode 16 or vice versa and the temperature of the wire 14 rises, the wire 14 made of a shape memory alloy decreases in length. When the length of the wire 14 decreases, the hook 13 on which the wire 14 is hooked is lifted relative to the housing 12.

Since the hook 13 is integrated with the lens carrier 11, the hook 13 lifted relative to the housing 12 lifts the lens carrier 11 relative to the housing 12. In this way, the lens carrier 11 is driven. Conversely, when the current flowing through the wire 14 is terminated, the temperature thereof lowers and the length thereof increases. When the length of the wire 14 increases (returns back to its original length), the hook 13 and hence the lens carrier 11 are lowered.

A lens barrel (not shown) that holds a lens fits into the lens carrier 11. Driving the lens carrier 11 in the way described above therefore changes the position of the lens held in the lens barrel and hence the focal distance is adjusted. That is, autofocusing (AF) is performed (see WO 2008/099156A2, for example).

SUMMARY OF THE INVENTION

As described above, an AF driver using a wire made of a shape memory alloy has been proposed. The AF driver uses the characteristics of a shape memory alloy, that is, when a current is conducted through the wire and the temperature thereof rises, the wire increases in length, whereas decreasing in length when the temperature lowers. As shown in FIG. 1, since the wire 14 made of a shape memory alloy extends around the outer diameter of the lens carrier 11, into which the lens barrel located at the center of the driver is inserted, the outer shape of the driver is inevitably one or two sizes greater than the outer diameter of the lens carrier.

Another proposal has been made in which a voice coil motor is used to move a lens carrier for autofocusing. In the configuration in which a voice coil motor is used to perform autofocusing, however, the outer shape of the driver is also inevitably one or two sizes greater than the outer diameter of the lens carrier, because a magnetic circuit is formed around the outer diameter of the lens carrier.

Another proposal has been made in which a piezoelectric device is used to move a lens carrier for autofocusing. In the configuration in which a piezoelectric device is used to move a lens carrier for autofocusing, however, the outer shape of the module is also inevitably one or two sizes greater than the outer diameter of the lens carrier, because a piezoelectric device driver is formed around the outer diameter of the lens carrier.

It is desired in recent years to reduce the size of an AF driver as the size of digital cameras has been reduced and mobile phones having a digital camera capability have become popular. The size of an AF driver can be reduced by reducing the size of an optical system, such as a lens, but in return the amount of light likely decreases, disadvantageously resulting in degradation in image quality. It is therefore not preferable to reduce the size of a lens or similar optical components in order to reduce the size of an AF driver. Nevertheless, further reduction in the size of the driver is desired, as described above.

Thus, it is desirable to reduce the size of a lens driving portion.

A driver according to an embodiment of the invention includes a first member that holds a lens, a second member to which the first member is fixed, and drive means for driving the second member, and a portion in which at least part of the drive means is accommodated is provided in the side surface of the second member.

The drive means may include a wire made of a shape memory alloy, and a portion in which at least part of the wire is accommodated may be provided in the side surface of the second member.

The drive means may be a voice coil motor formed of a coil, a magnet, and a yoke, and a portion in which the coil is disposed may be provided in the side surface of the second member, the portion accommodating part or all of the magnet and the yoke disposed in a position facing the coil.

The drive means may include a piezoelectric device, and a portion in which part or all of a shaft connected to the piezoelectric device is accommodated may be provided in the side surface of the second member.

The portion may be formed of a plurality of portions in the side surface of the second member.

In the embodiment of the invention described above, a portion in which part or all of the drive means is accommodated is provided in part of the lens driving member.

According to the embodiment of the invention, the size of the lens driving portion can be reduced.

DESCRIPTION OF THE PREFERRED EMBODIMENTS

Embodiments of the invention will be described below with reference to the drawings.

The invention can be applied to a driver. The driver described herein is specifically a lens driving device accommodated in, for example, a digital still camera and a mobile phone having a digital still camera capability. Autofocusing (AF) is performed by driving a lens (for example, moving a lens relative to an imaging device in such a way that the lens approaches the imaging device or travels away therefrom).

Figure 1:
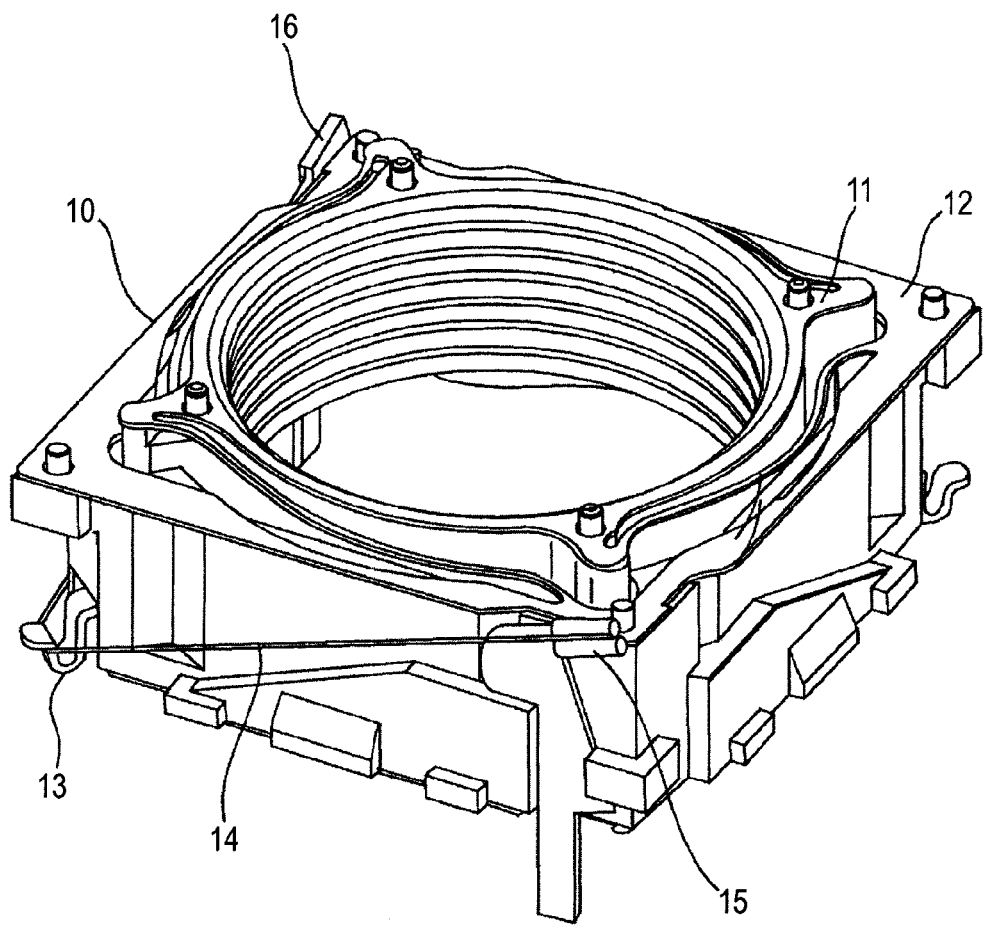
FIG. 1 shows the configuration of an exemplary driver of related art.

A driver for performing autofocusing has, for example, the configuration shown in FIG. 1. Referring to FIG. 1 again, the driver is formed of the lens carrier 11 and the housing 12, which accommodates the lens carrier 11. The lens carrier 11 is configured to be movable relative to the housing 12 in the upward and downward directions in FIG. 1 (in the direction toward the imaging device (not shown) or away therefrom).

The embodiments described below primarily relate to a lens carrier. A lens carrier to which any of the embodiments described below is applied can be smaller than a lens carrier of related art. The housing 12 that accommodates such a smaller lens carrier can also be reduced in size. When the housing 12 thus reduced in size is accommodated in an apparatus, such as a digital still camera and a mobile phone, the size of the apparatus can be reduced (the space for the portion other than the housing 12 can be increased, whereby other functions can be enhanced).

A description will next be made of a lens carrier expected to show the advantageous effects described above. Methods for performing autofocusing having been proposed include a method using a wire made of a shape memory alloy (the method described with reference to FIG. 1), a method using a voice coil motor, and a method using a piezoelectric device. In the following description, the embodiments will be described with reference to the methods described above. That is, the following description includes a first embodiment in which a wire made of a shape memory alloy is used to perform autofocusing, a second embodiment in which a voice coil motor is used to perform autofocusing, and a third embodiment in which a piezoelectric device is used to perform autofocusing.

In the following description, a member that holds a lens is referred to as a lens barrel, a member to which the lens barrel is fixed is referred to as a lens carrier, and a portion that drives the lens carrier is referred to as a driver, as appropriate. The lens barrel has a portion in which at least part of the driver is accommodated, and the portion is referred to as a cutout.

First Embodiment

Figure 2:
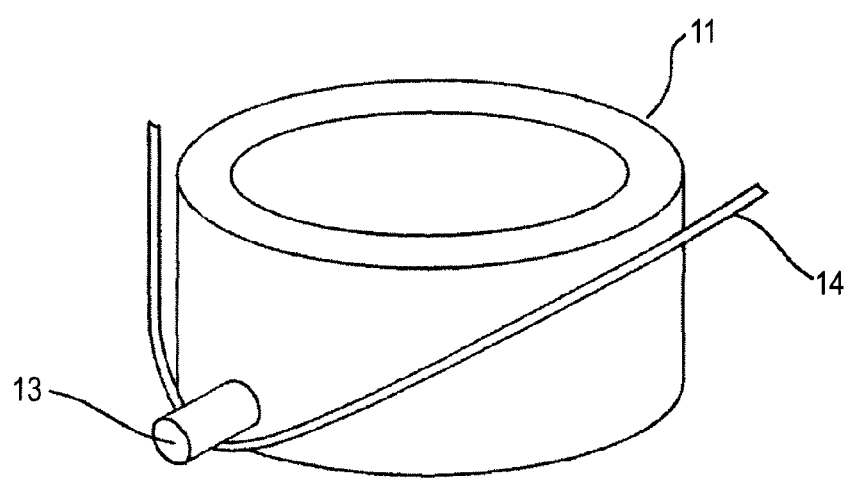
FIG. 2 shows the configuration of a lens carrier of related art.

A first embodiment will be described below. The configuration of a lens carrier of related art is first shown in FIG. 2 and described for comparison. FIG. 2 shows the exterior configuration of the lens carrier 11 shown in FIG. 1. The lens carrier 11 has a cylindrical shape, and the hook 13 is disposed in a predetermined position on the outer side surface of the lens carrier 11. The wire 14 is hooked on the hook 13. The hook 13 needs to be long enough to extend off the housing 12 (FIG. 1) (longer than or equal to the thickness of the housing 12) when the lens carrier 11 is accommodated in the housing 12.

Figure 3A:
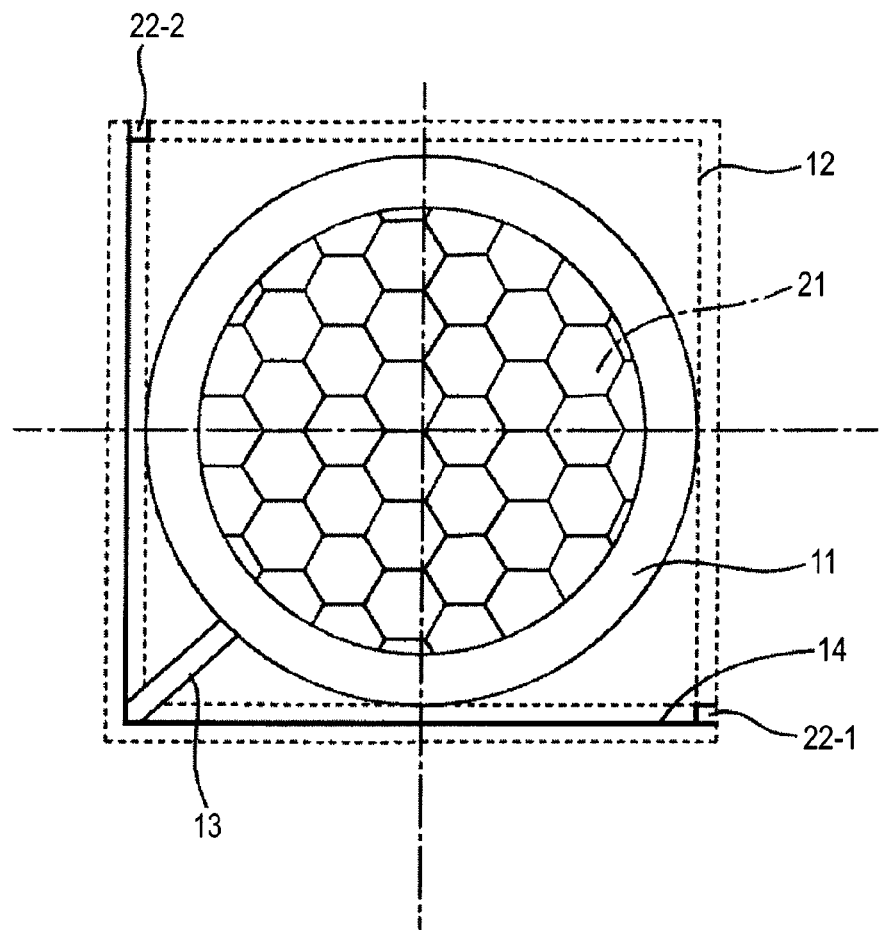
FIGS. 3A and 3B show the configuration of the lens carrier of related art.
Figure 3B:
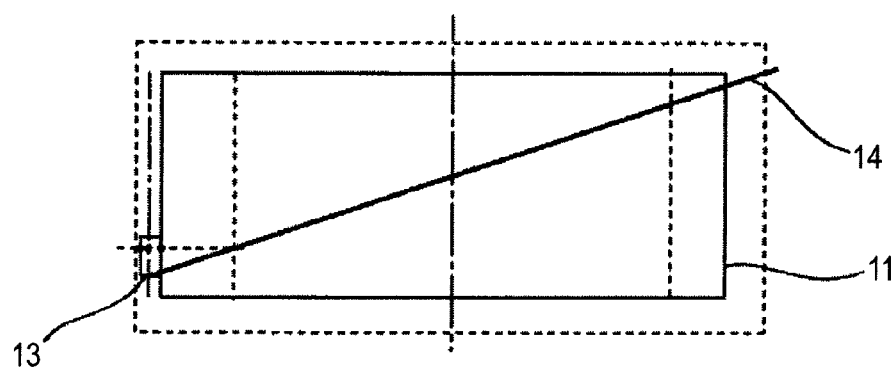

FIG. 3A is a top view of the lens carrier 11, and FIG. 3B is a side view of the lens carrier 11. A lens barrel 21 is secured in the lens carrier 11. The lens barrel 21 holds a plurality of lenses (not shown). Since the lens carrier 11 has the hook 13 provided thereon and the wire 14 is hooked on the hook 13, the wire 14 is positioned outside the lens carrier 11, as shown in FIG. 3A. In the example shown in FIGS. 3A and 3B, the wire 14 is disposed along two sides.

One end of the wire 14 is connected to an electrode 22-1, and the other end is connected to an electrode 22-2. The electrodes 22-1 and 22-2 are disposed outside the housing 12, in which the lens carrier 11 is enclosed, as shown in FIG. 1.

In the structure described above, in which the wire 14 is disposed outside the lens carrier 11, it is difficult to make the driver 10 smaller than the rectangle indicated by the dotted line shown in FIGS. 3A and 3B. In the present embodiment, the size of the driver is reduced by arranging the lens carrier and the wire as shown in FIG. 4.

Figure 4:
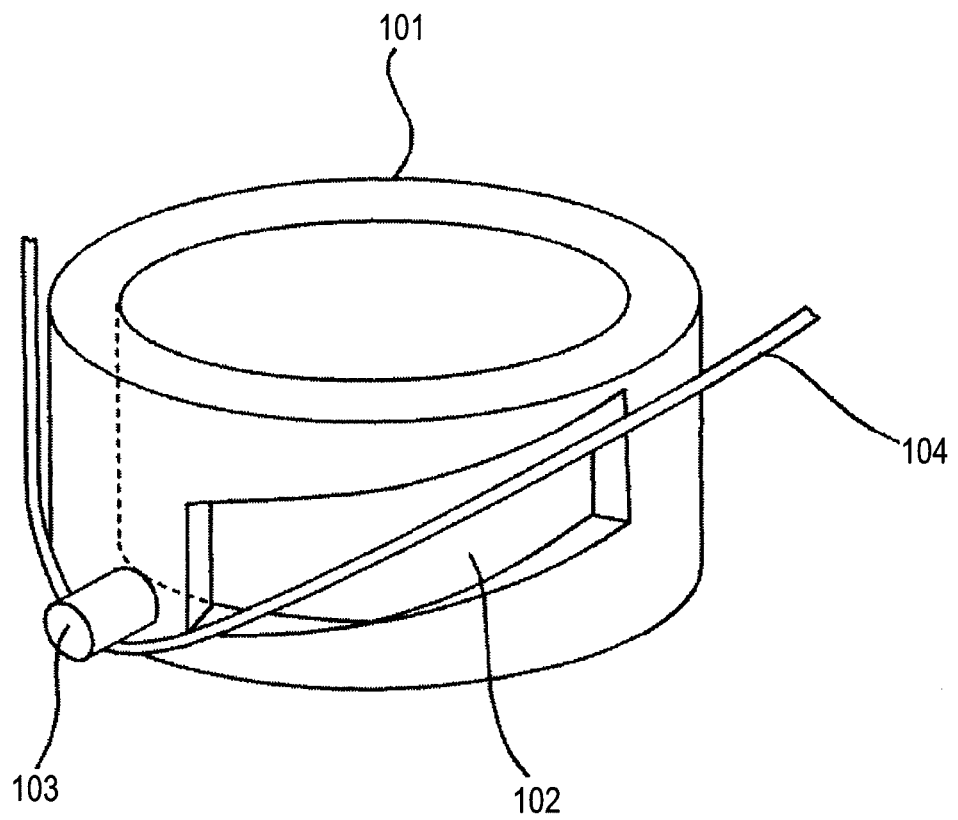
FIG. 4 shows the configuration of a lens carrier to which an embodiment of the invention is applied.

FIG. 4 shows an exterior configuration of a lens carrier to which an embodiment of the invention is applied. A lens carrier 101 shown in FIG. 4 includes cutouts 102 and a hook 103, and a wire 104 is hooked on the hook 103. The cutouts 102 are provided in the side surface of the lens carrier 101 and configured to accommodate the wire 104.

The cutouts 102 may be sized to accommodate at least the wire 104. A specific size of the cutouts 102 depends on the material and the thickness of the lens carrier 101. For example, the cutouts 102 can be larger as long as the strength of the lens carrier 101 is ensured and may pass through the wall of the lens carrier 101.

When large cutouts 102 do not ensure the strength of the lens carrier 101, the size of the cutouts 102 is preferably smaller. Even when the size of the cutouts 102 is small, it is necessary to satisfy the following requirements: That is, the size of the cutouts 102 needs to be determined in consideration of the thickness of the wire 104 made of a shape memory alloy and ensures that the wire 104 does not prevent the movement of the lens carrier 101.

Providing the thus sized cutouts 102 in the lens carrier 101 allows reduction in the size of the lens carrier 101. The size reduction and the cutouts 102 will further be described with reference to FIGS. 5A and 5B.

Figure 5A:
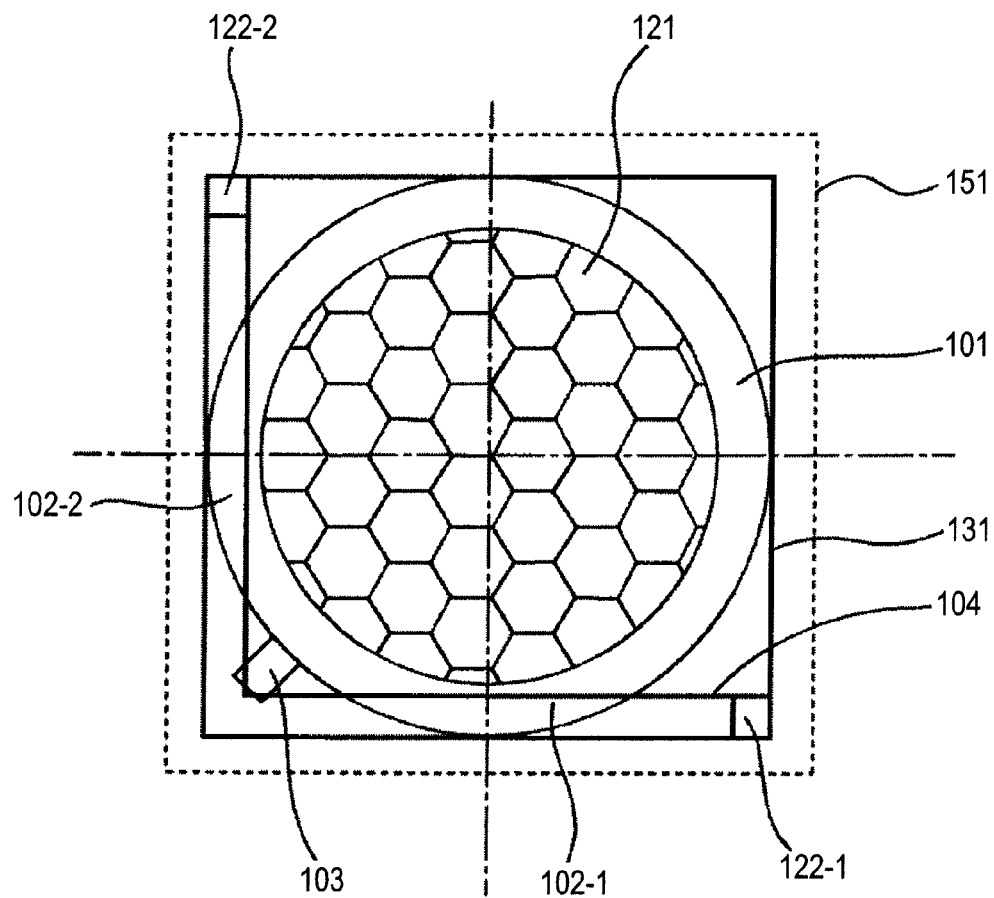
FIGS. 5A and 5B describe the configuration of the lens carrier.
Figure 5B:
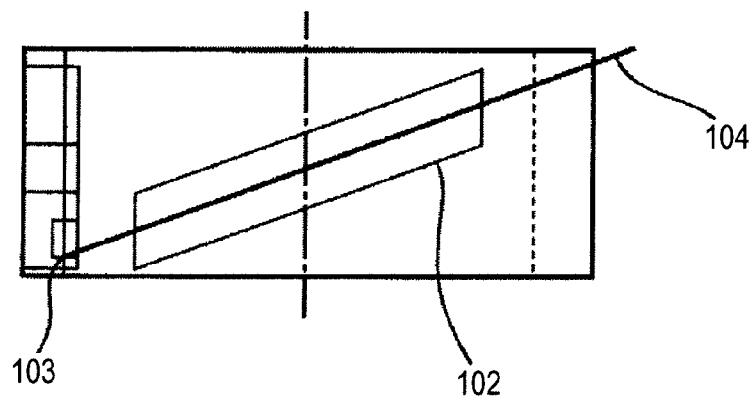

FIGS. 5A and 5B show the configuration of a lens driver including the lens carrier 101. FIG. 5A is a top view of the lens carrier 101, and FIG. 5B is a side view of the lens carrier 101. A lens barrel 121 is secured in the lens carrier 101. The lens barrel 121 holds a plurality of lenses (not shown). The lens carrier 101 has the hook 103 provided thereon, and the wire 104 is hooked on the hook 103. In the example shown in FIGS. 5A and 5B, the wire 104 is disposed along two sides.

One end of the wire 104 is connected to an electrode 122-1, and the other end is connected to an electrode 122-2 (hereinafter simply referred to as the electrodes 122 when they are not necessary to be distinguished). The electrodes 122 are disposed in a housing 131 in which the lens carrier 101 is enclosed. At the same time, the electrodes 122 are disposed in a space between the lens carrier 101 and the housing 131. The space in which the electrodes 122 are accommodated can be provided by providing the cutouts 102 in the lens carrier 101, as shown in FIG. 4.

Referring to FIG. 5A, the wire 104 is arranged along two inner sides of the housing 131. The arrangement is allowed because the wire 104 is accommodated in the cutouts 102-1 and 102-2 in the lens carrier 101. When parts of the wire 104 are accommodated in the cutouts 102-1 and 102-2, respectively, the size of the driver can be smaller than that of the structure in which the wire 14 is disposed outside the lens carrier 11, which has been described with reference to FIGS. 3A and 3B.

In other words, providing the cutouts 102 in the lens carrier 101 in such a way that the wire 104 is disposed inside the diameter of the lens carrier 101 allows part of the wire 104 to be accommodated in the lens carrier 101 and the wire 104 to be disposed in the housing 131.

The outer rectangular dotted line 151 shown in FIG. 5A indicates the size of the driver of related art. FIG. 5A shows that applying the invention allows size reduction as compared with the driver of related art. Further, the reduction in the size of the driver described above does not require reducing the diameters the lenses driven by the driver or reducing the number of pixels of an imaging device used in an imaging apparatus including the driver, whereby the size reduction is achieved without any degradation in image quality.

The requirements that the cutouts 102 should satisfy have been described above. Providing the cutouts 102, in which the wire 104 forming the portion for driving the lens carrier 101 is accommodated, in the lens carrier 101 allows the configuration of the lens driver itself to be reduced in size.

Second Embodiment

Figure 6:
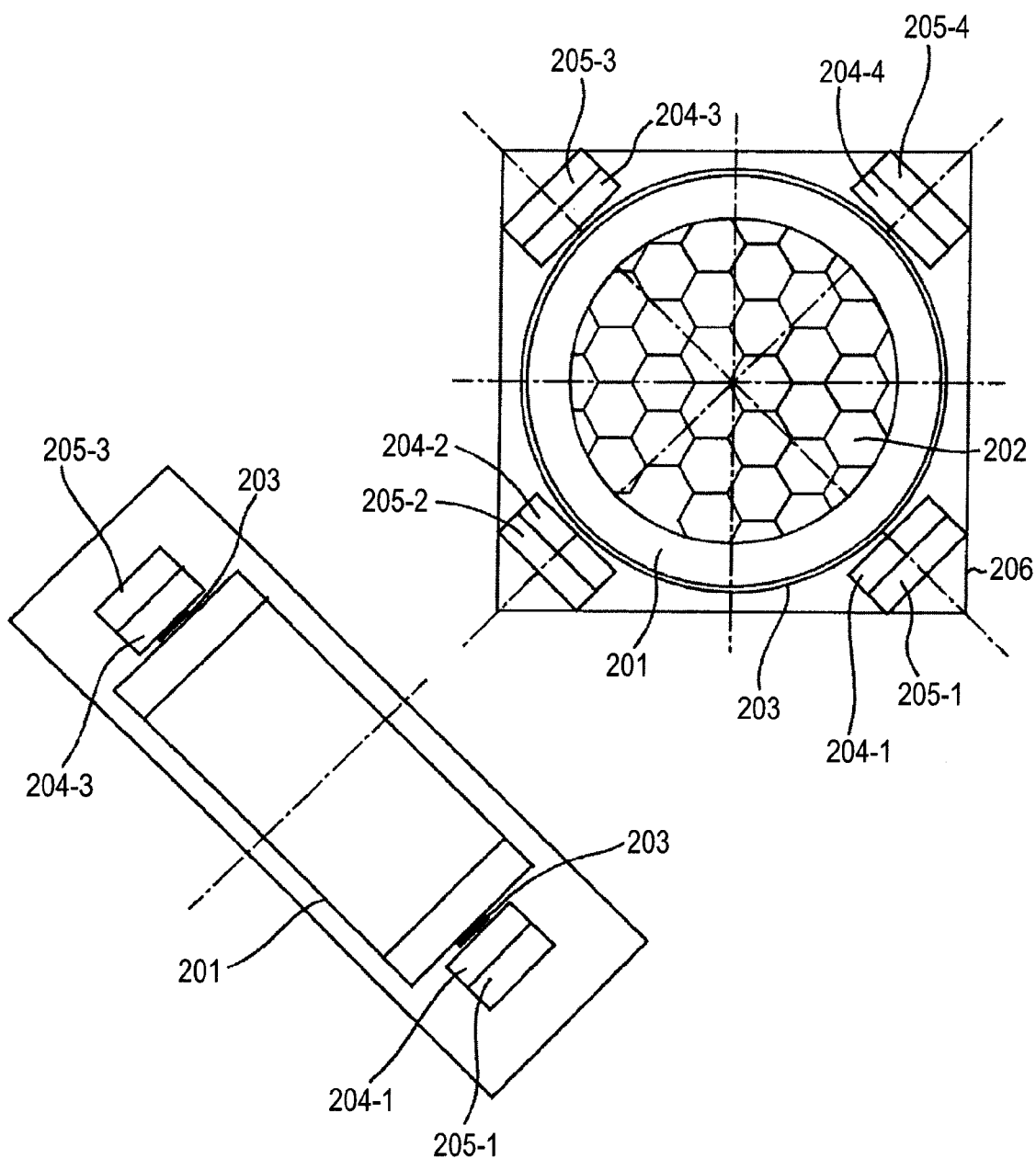
FIG. 6 shows the configuration of a lens carrier of related art.

A second embodiment will be described below. The second embodiment relates to a case where a voice coil motor is used to perform autofocusing. The configuration of a lens carrier of related art is first shown in FIG. 6 and described for comparison. FIG. 6 shows a lens carrier 201 viewed from the above and from a side.

A lens barrel 202 is secured in the lens carrier 201. The lens barrel 202 holds a plurality of lenses (not shown). A coil 203 surrounds the outer side surface of the lens carrier 201, and magnets 204-1 to 204-4 are provided in predetermined positions facing the coil 203. The magnets 204-1 to 204-4 are hereinafter simply referred to as the magnets 204 when they are not necessary to be distinguished. The same applies to other portions in the following description.

The magnets 204-1 to 204-4 are provided with yokes 205-1 to 205-4, respectively. As shown in FIG. 6, the magnets 204 and the yokes 205 are positioned outside the lens carrier 201. In the example shown in FIG. 6, the magnets 204-1 to 204-4 (yokes 205-1 to 205-4) are disposed at the four corners. The magnets 204 and the yokes 205 are disposed inside a housing 206 in which the lens carrier 201 is enclosed, as shown in FIG. 6. The coil 203, the magnets 204, and the yokes 205 form a voice coil motor.

In the structure described above, in which the magnets 204 (yokes 205) are disposed outside the lens carrier 201, it is difficult to reduce the size of the housing 206. In the second embodiment, the size of a driver is reduced by arranging the lens carrier and the magnets as shown in FIG. 7.

Figure 7:
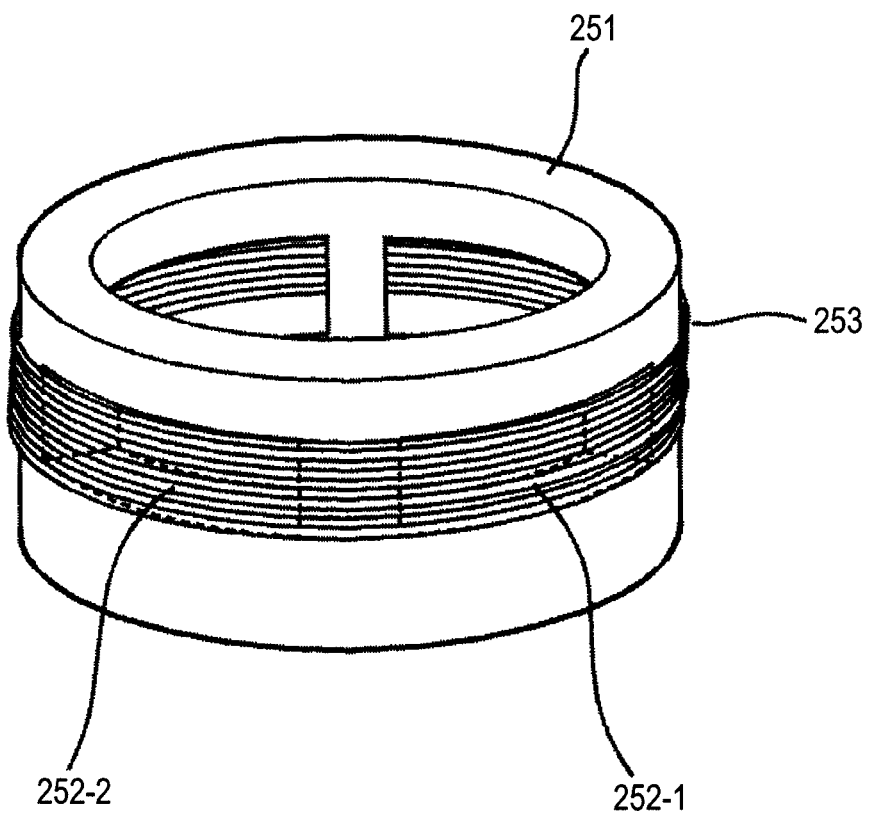
FIG. 7 shows the configuration of a lens carrier to which another embodiment of the invention is applied.

FIG. 7 shows an exterior configuration of a lens carrier to which an embodiment of the invention is applied. A lens carrier 251 shown in FIG. 7 includes cutouts 252-1 and 252-2 and not-shown cutouts 252-3 and 252-4 (hereinafter simply referred to as the cutouts 252 when they are not necessary to be distinguished). The cutouts 252 are provided in the side surface of the lens carrier 251 and configured to accommodate a coil 253 and magnets and yokes shown in FIG. 8 (it is hereinafter assumed that a magnet, even when simply described as a magnet, include a yoke unless otherwise specified).

The cutouts 252 may be sized to accommodate part or all of the magnets. A specific size of the cutouts 252 depends on the material and the thickness of the lens carrier 251. For example, the cutouts 252 can be larger as long as the strength of the lens carrier 251 is ensured and may pass through the wall of the lens carrier 251.

When large cutouts 252 do not ensure the strength of the lens carrier 251, the size of the cutouts 252 is preferably smaller. Even when the size of the cutouts 252 is small, it is necessary to satisfy the following requirements: That is, it is necessary to set the height of the cutouts 252 not to prevent the autofocusing from being performed and the width of the cutouts 252 to be larger than the outer diameter of the lens barrel.

Providing the thus sized cutouts 252 in the lens carrier 251 allows reduction in the size of the lens carrier 251. The size reduction and the cutouts 252 will further be described with reference to FIG. 8.

Figure 8:
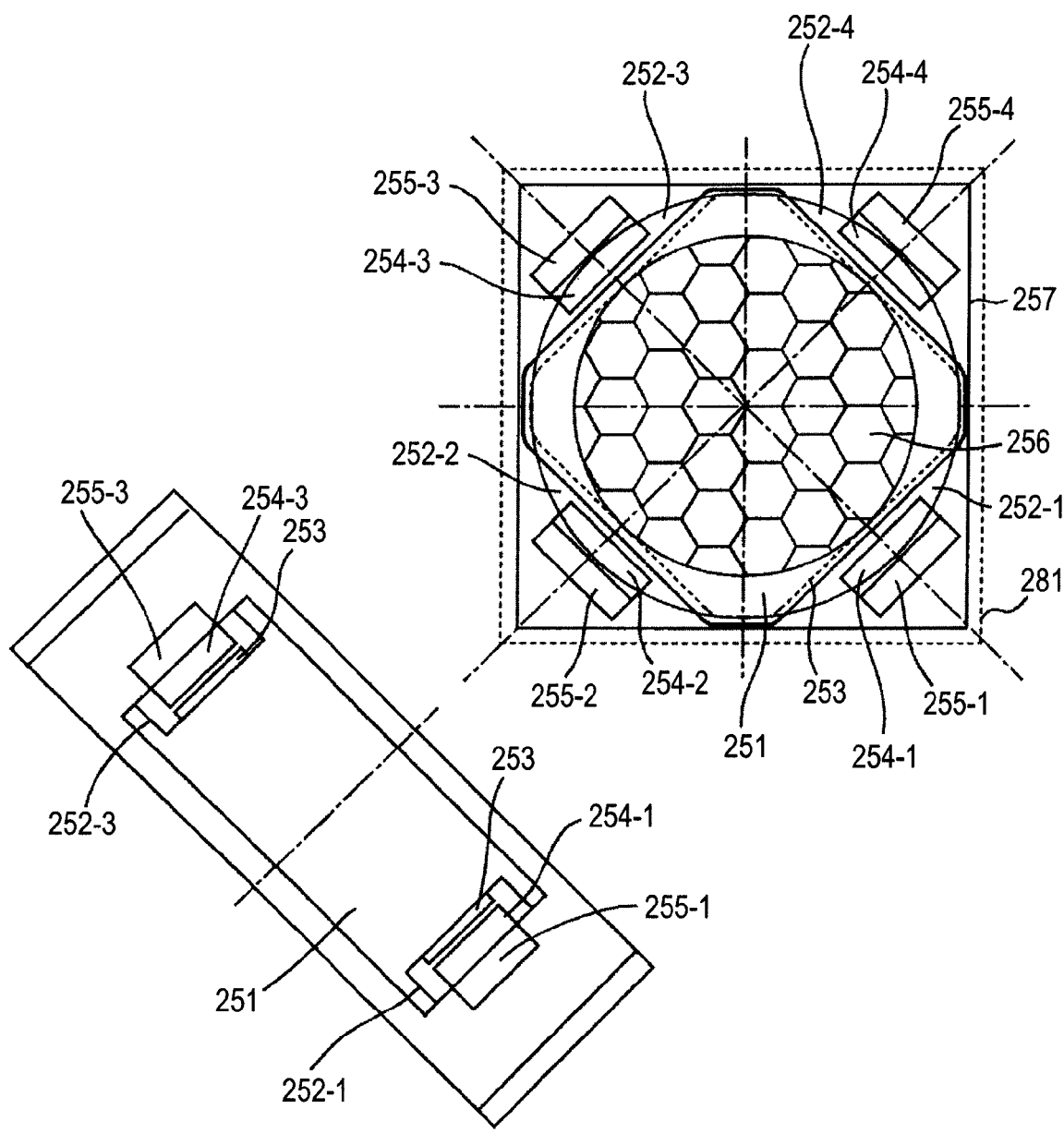
FIG. 8 describes the configuration of the lens carrier.

FIG. 8 shows the configuration of a lens driver including the lens carrier 251. FIG. 8 shows the lens carrier 251 viewed from the above and from a side. A lens barrel 256 is secured in the lens carrier 251. The lens barrel 256 holds a plurality of lenses (not shown). The coil 253 surrounds the outside of the lens carrier 251, and magnets 254-1 to 254-4 are provided in predetermined positions facing the coil 253.

The magnets 254-1 to 254-4 are provided with yokes 255-1 to 255-4, respectively. In the example shown in FIG. 8, the magnets 254-1 to 254-4 (yokes 255-1 to 255-4) are disposed at the four corners. The magnets 254 and the yokes 255 are disposed inside a housing 257 in which the lens carrier 251 is enclosed, as shown in FIG. 8.

The magnets 254 (yokes 255) are disposed in such a way that part or all thereof are accommodated in the cutouts 252 provided in the outer side surface of the lens carrier 251. That is, part or all of the magnet 254-1 and the yoke 255-1 are configured to be accommodated in the cutout 252-1 provided in lens carrier 251. Part or all of the magnet 254-2 and the yoke 255-2 are configured to be accommodated in the cutout 252-2 provided in lens carrier 251.

Part or all of the magnet 254-3 and the yoke 255-3 are configured to be accommodated in the cutout 252-3 provided in lens carrier 251. Part or all of the magnet 254-4 and the yoke 255-4 are configured to be accommodated in the cutout 252-4 provided in lens carrier 251.

The coil 253 also surrounds the lens carrier 251 in the position where the cutouts 252 are provided. The coil 253 therefore has a substantially rectangular (substantially square) shape when the lens carrier 251 is viewed from the above, as shown in FIG. 8. In other words, the cross section of the lens carrier 251 taken along the portion where the cutouts 252 are provided has a substantially rectangular shape whose sides are formed of the cutouts 252-1 to 252-4 and corners where no cutout 252 is provided have their original shapes. Disposed on the side surface having the shape described above, the coil 253 has a shape corresponding to the shape of the side surface.

Referring to FIG. 8, the coil 253 is configured to be accommodated in the cutouts 252 in the lens carrier 251, as described above. The magnets 254 and the yokes 255 are also configured to be accommodated in the cutouts 252, in which the coil 253 is accommodated. The configuration allows the size of the driver to be smaller than that of the driver shown in FIG. 6 or any other driver of related art in which a coil, magnets, and yokes are not accommodated in a lens carrier.

In other words, providing the cutouts 252 in the lens carrier 251 in such a way that the coil 253, the magnets 254, and the yokes 255 are disposed inside the diameter (outer shape) of the lens carrier 251 allows at least part of the coil 253, the magnets 254, and the yokes 255 (part of the portion for driving the lens carrier 251) to be accommodated in the lens carrier 251.

The outer rectangular dotted line 281 shown in FIG. 8 indicates the size of the driver of related art. FIG. 8 shows that applying the invention allows size reduction as compared with the driver of related art. Further, the reduction in the size of the driver described above does not require reducing the diameters the lenses driven by the driver or reducing the number of pixels of an imaging device used in an imaging apparatus including the driver, whereby the size reduction is achieved without any degradation in image quality.

Figure 9:
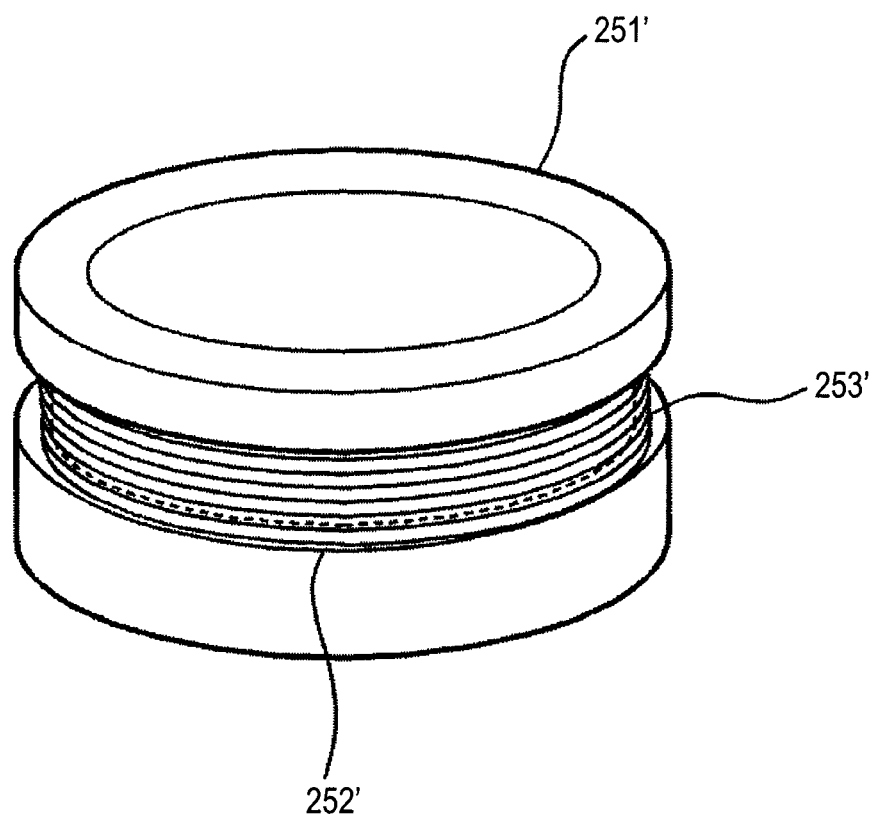
FIG. 9 shows the configuration of a lens carrier to which another embodiment of the invention is applied.

The requirements that the cutouts 252 should satisfy have been described above. FIG. 9 shows the configuration of a lens carrier 251' that satisfies the requirements described above but has a shape different from that of the lens carrier 251 shown in FIG. 7 (each reference numeral is accompanied by a prime to indicate that the lens carrier 251' differs from the lens carrier 251 shown in FIG. 7 in terms of shape).

The lens carrier 251' shown in FIG. 9 has a cutout 252' having the same shape as that of the lens carrier 251', that is, a circular shape. Part of the lens carrier 251' has a smaller diameter than the other portion, and the cutout 252' is provided in the portion having the smaller diameter. A coil 253' is provided around the cutouts 252'. The coil 253' therefore also has a circular shape.

The magnets 254 and the yokes 255, which are not shown in FIG. 9, are accommodated in the cutouts 252'. A driver including the lens carrier 251' having the configuration described above and an imaging apparatus including the driver can be reduced in size, as in the case where the lens carrier 251 shown in FIGS. 7 and 8 is used.

The driver shown in FIG. 8 has been described with reference to the case where the four magnets 254 are provided. The invention is also applicable to a case where the number of magnets 254 is not four but, for example, two. In other words, the number of magnets does not limit the scope of the invention.

Third Embodiment

Figure 10:
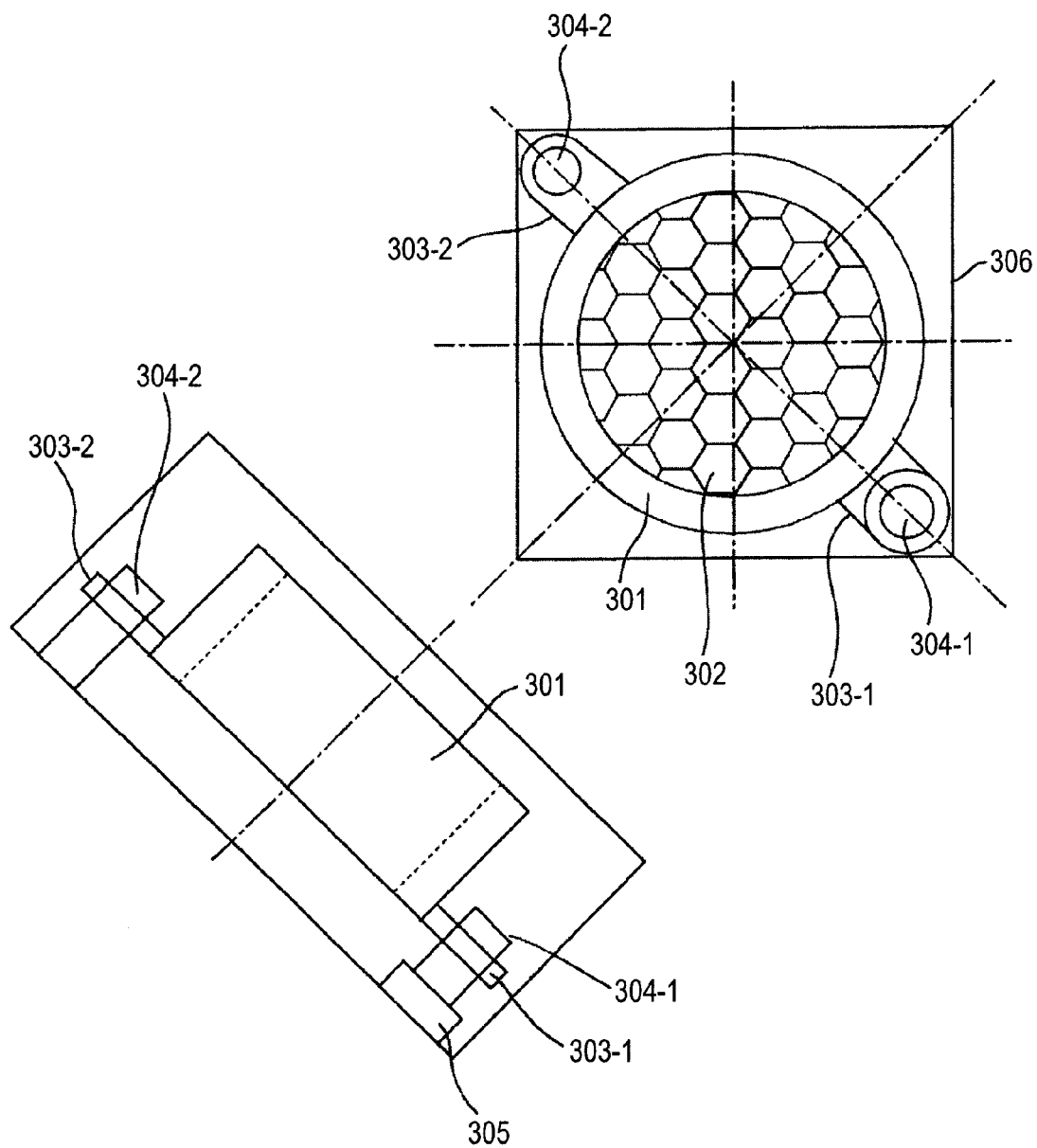
FIG. 10 shows the configuration of a lens carrier of related art.

A third embodiment will be described below. The third embodiment relates to a case where a piezoelectric device is used to perform autofocusing. A piezoelectric device is a passive device using a piezoelectric effect in which a force applied to a piezoelectric member is converted into a voltage and vice versa. To describe a lens carrier using a piezoelectric device to perform autofocusing, the configuration of a lens carrier of related art is first shown in FIG. 10 for comparison. FIG. 10 shows a lens carrier 301 viewed from the above and from a side.

A lens barrel 302 is secured in the lens carrier 301. The lens barrel 302 holds a plurality of lenses (not shown). Slide hooks 303-1 and 303-2 are provided in predetermined positions on the outer side surface of the lens carrier 301, and the slide hooks 303-1 and 303-2 are disposed on opposite sides of the lens carrier 301.

One of the ends of each of the slide hooks 303 is connected to the lens carrier 301, and the other end has a circular shape having a circular hole at the center thereof. Shafts 304 pass through the respective holes. That is, the lens carrier 301 is accommodated in a housing 306 with a shaft 304-1 passing through the hole in the slide hook 303-1 and a shaft 304-2 passing through the hole in the slide hook 303-2.

A piezoelectric device 305 attached to the shaft 303-1 is fixed to the housing 306. When a current is conducted through the piezoelectric device 305, a force is produced and causes the slide hook 303-1 to slide. When the slide hook 303-1 slides, the lens carrier 301 moves relative to the housing 306 in the upward or downward direction (the direction toward or away from an imaging device (not shown)). Autofocusing is thus performed.

In the structure described above, in which the slide hooks 303 and the shafts 304 are disposed outside the lens carrier 301, it is difficult to reduce the size of the housing 306. In the third embodiment, the size of a driver is reduced by arranging the lens carrier and the shafts as shown in FIG. 11.

Figure 11:
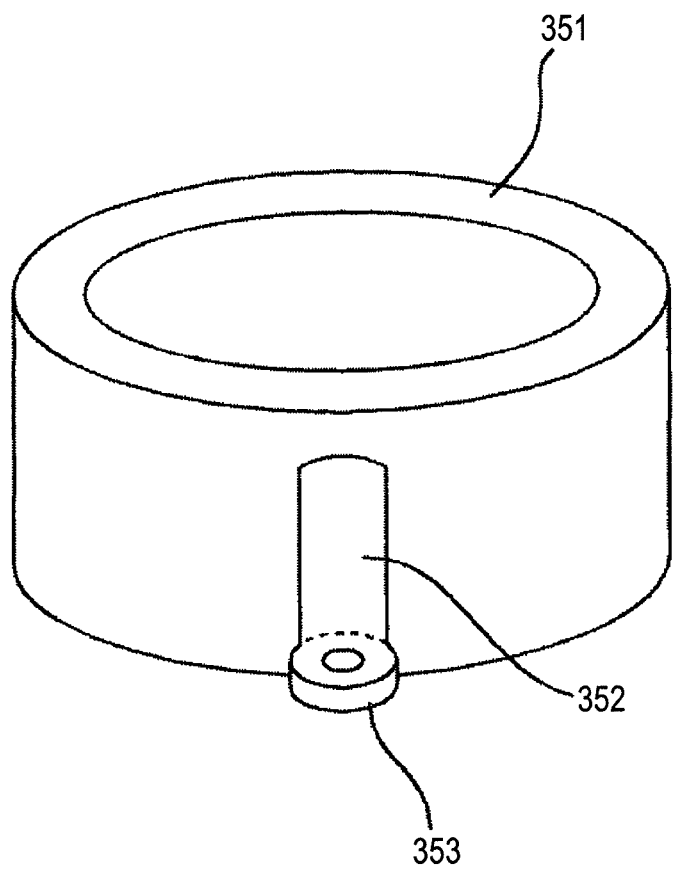
FIG. 11 shows the configuration of a lens carrier to which another embodiment of the invention is applied.

FIG. 11 shows an exterior configuration of a lens carrier to which an embodiment of the invention is applied. A lens carrier 351 shown in FIG. 11 includes cutouts 352. The cutouts 352 are provided in the side surface of the lens carrier 351 and configured to accommodate shafts shown in FIG. 12.

The cutouts 352 may be sized to accommodate part or all of the shafts. A specific size of the cutouts 352 depends on the material and the thickness of the lens carrier 351. For example, the cutouts 352 can be larger as long as the strength of the lens carrier 351 is ensured and may pass through the wall of the lens carrier 351.

When large cutouts 352 do not ensure the strength of the lens carrier 351, the size of the cutouts 352 should be smaller. Even when the size of the cutouts 352 is small, it is necessary to satisfy the following requirements: That is, the height of each of the cutouts 352 needs to be sized in such a way that the lower end of the cutout 352 does not come into contact with the tip of the corresponding shaft to which the piezoelectric device is secured when the shaft is moved in an autofocusing operation. Further, the depth of the cutouts 352 needs to be sized in such a way that the side surfaces of the shafts, one of which the piezoelectric device is secured to, do not come into contact with the cutouts 352.

Providing the thus sized cutouts 352 in the lens carrier 351 allows reduction in the size of the lens carrier 351. The size reduction and the cutouts 352 will further be described with reference to FIG. 12.

Figure 12:
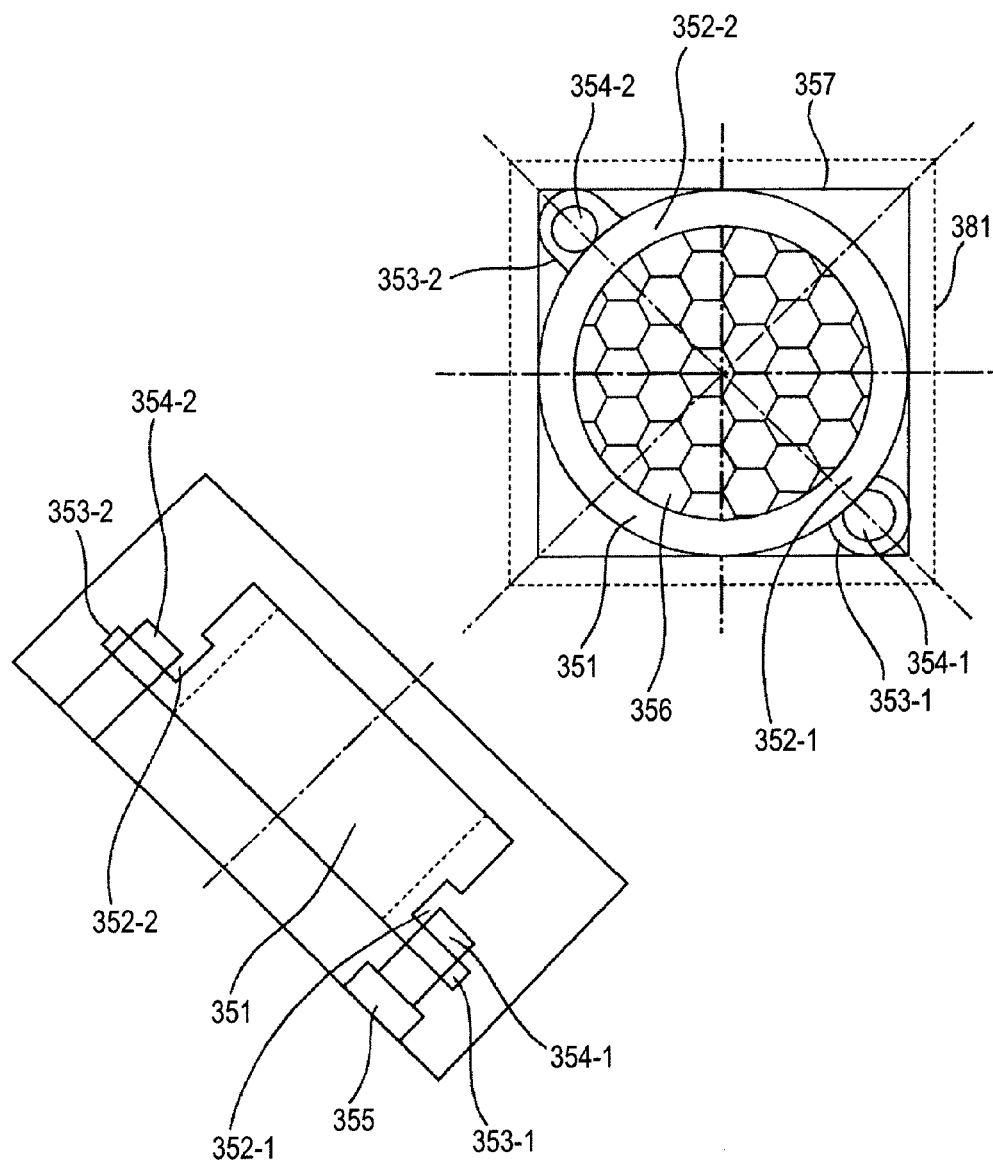
FIG. 12 describes the configuration of the lens carrier.

FIG. 12 shows the configuration of a lens driver including the lens carrier 351. FIG. 12 shows the lens carrier 351 viewed from the above and from a side. A lens barrel 356 is secured in the lens carrier 351. The lens barrel 356 holds a plurality of lenses (not shown). Slide hooks 353-1 and 353-2 are provided in predetermined positions on the outer side of the lens carrier 351. The slide hooks 353-1 and 353-2 are disposed on opposite sides of the lens carrier 351 with the lens carrier 351 interposed therebetween.

One of the ends of each of the slide hooks 353 is connected to the lens carrier 351, and the other end has a circular shape having a circular hole at the center thereof. Shafts 354 pass through the respective holes. That is, the lens carrier 351 is accommodated in a housing 357 with a shaft 354-1 passing through the hole in the slide hook 353-1 and a shaft 354-2 passing through the hole in the slide hook 353-2.

A piezoelectric device 355 attached to the shaft 354-1 is fixed to the housing 357. When a current is conducted through the piezoelectric device 355, a force is produced and causes the slide hook 353-1 to slide. When the slide hook 353-1 slides, the lens carrier 351 moves relative to the housing 357 in the upward or downward direction (the direction toward or away from an imaging device (not shown)). Autofocusing is thus performed. No piezoelectric device is attached to the shaft 354-2. The shaft 354-2 is provided to hold the lens carrier 351.

The lens carrier 351 shown in FIG. 12 has been described with reference to the case where the two slide hooks 353-1 and 353-2 are provided. The lens carrier 351 can alternatively be configured to have three or four slide hooks 353. The shafts are provided in correspondence with the number of slide hooks. The number of piezoelectric device 355 is not limited to one but can be two or more. The description continues with reference to a case where two shafts are provided.

The shafts 354-1 and 354-2 are disposed at two inner corners of the housing 357. The piezoelectric device 355 is disposed at one inner corner of the housing 357. The shafts 354 (piezoelectric device 355) are disposed in such a way that part or all thereof are accommodated in the cutouts 352 provided in the outer side surface of the lens carrier 351. That is, part or all of the shaft 354-1 and the piezoelectric device 355 are accommodated in the cutout 352-1 in the lens carrier 351. Part or all of the shaft 354-2 is accommodated in the cutout 352-2 in the lens carrier 351.

Since the shafts 354 are accommodated in the cutouts 352 in the lens carrier 351, the slide hooks 353, through which the shafts 354 pass, are shorter than the slide hooks 303 of related art (FIG. 10). Each of the slide hooks 303 of related art has a combined shape of a rectangular portion and a circular portion, whereas each of the slide hooks 353 has a shorter rectangular portion. In other words, each of the slide hooks 353 can be configured as part of the corresponding cutout 352, as shown in FIG. 11.

As described above, the slide hooks 353 and the shafts 354 are configured to be accommodated in the cutouts 352 in the lens carrier 351. Further, the piezoelectric device 355 is also configured to the accommodated in one of the cutouts 352, in which the shafts 354 are accommodated. The configuration described above allows the size of the driver to be smaller than that of the driver shown in FIG. 9 or any other driver of related art in which slide hooks, shafts, and a piezoelectric device are not accommodated in a lens carrier (all the components described above are provided outside the lens carrier).

In other words, providing the cutouts 352 in the lens carrier 351 in such a way that the slide hooks 353, the shafts 354, and the piezoelectric device 355 are disposed inside the diameter (outer shape) of the lens carrier 351 allows at least part of the slide hooks 353, the shafts 354, and the piezoelectric device 355 (at least part of the portion for driving the lens carrier 351) to be accommodated in the lens carrier 351.

The outer rectangular dotted line 381 shown in FIG. 12 indicates the size of the driver of related art. FIG. 12 shows that applying the invention allows size reduction as compared with the driver of related art. Further, the reduction in the size of the driver described above does not require reducing the diameters the lenses driven by the driver or reducing the number of pixels of an imaging device used in an imaging apparatus including the driver, whereby the size reduction is achieved without any degradation in image quality.

The requirements that the cutouts 352 should satisfy have been described above. In addition to the lens carrier 351 shown in FIGS. 11 and 12, lens carriers having any shape that satisfies the requirements described above, of course, fall within the scope of the invention.

In addition to the embodiments described above, the following embodiments, although not shown, can be implemented. A polymer actuator can be used as the actuator (driver). Using a polymer actuator also allows the size reduction by cutting part of a lens carrier and forming the polymer actuator in the cut portion.

A stepper motor can alternatively be used. Using a stepper motor also allows the size reduction by cutting part of a lens carrier and inserting the stepper motor into the cut portion.

As described above, in any of the embodiments described above, since part of a lens carrier is cut and an actuator (device that allows a drive operation) is formed in the cut portion, a lens driver can be reduced in size. Further, a lens module and a camera module including the driver can be reduced in size. Moreover, the reduction in the size of the driver increases a space for the portion other than the driver, and the thus created extra space can be used to enhance other functions of an apparatus including the driver thus reduced in size and hence the performance of the apparatus can be improved.

Further, cutting part of a lens carrier allows the lens carrier itself to be reduced in weight. It is therefore possible to reduce the magnitude of a driving force necessary to drive the lighter-weight lens carrier, whereby power consumption can be reduced and the size of the driver can be further reduced. It is also expected that the size reduction advantageously reduces the amount of material to be used and hence reduces the cost.

The present application contains subject matter related to that disclosed in Japanese Priority Patent Application JP 2009-168437 filed in the Japan Patent Office on Jul. 17, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A lens driver comprising:
a first member that holds a lens;
a second hollow cylindrical member to which the first member is fixed; and
a drive means for driving the second hollow cylindrical member,
wherein the second hollow cylindrical member has contiguous interior and exterior side walls respectively located at an inner diameter and at an outer diameter and at least a portion of the drive means is located within a recessed portion between the outer and inner diameters of the second hollow cylindrical member sidewalls, the drive means being located such that portions of the second hollow cylindrical member are located at opposite sides of a drive means portion that is within the recess, the second hollow cylindrical member having a greatest diameter and the recess being located within the greatest diameter, and further wherein the drive means is arranged in the recess such that it has a portion that extends diagonally upward across the second hollow cylindrical member.

2. The driver according to claim 1,
wherein the drive means includes a wire made of a shape memory alloy, and
a portion of the wire is located within the recessed portion formed in the side surface of the second hollow cylindrical member.

3. The driver according to claim 1,
wherein the drive means is a voice coil motor formed of a coil, a magnet, and a yoke, and
a portion of the coil is located within the recessed portion formed in the side surface of the second hollow cylindrical member.

4. The driver according to claim 1,
wherein the drive means includes a piezoelectric device, and
a portion in which part or all of a shaft connected to the piezoelectric device is located within the recessed portion formed in the side surface of the second hollow cylindrical member.

5. The driver according to claim 1,
wherein there are a plurality of recessed portions formed in the side surface of the second hollow cylindrical member.

6. A lens driver comprising:
a first member that holds a lens;
a hollow cylindrical second member to which the first member is fixed; and
a drive unit configured to drive the second member,
wherein the second hollow cylindrical member has contiguous interior and exterior side walls respectively located at an inner diameter and at an outer diameter and at least a portion of the drive unit is located within a recessed portion between the outer and inner diameters of the second hollow cylindrical member sidewalls, the drive unit being located such that portions of the hollow cylindrical second member are located at opposite sides of a drive means portion that is within the recessed portion, the second hollow cylindrical member having a greatest diameter and the recessed portion being located within the greatest diameter, and further wherein the drive means is arranged in the recess such that it has a portion that extends diagonally upward across the second hollow cylindrical member.

* * * * *